United States Patent [19]

Watanabe et al.

[11] Patent Number: 4,783,104

[45] Date of Patent: Nov. 8, 1988

[54] BUMPER ASSEMBLY

[75] Inventors: Toshiro Watanabe, Tokyo; Masaharu Takeda, Sagamihara, both of Japan

[73] Assignee: Nissan Motor Company, Ltd., Yokohama, Japan

[21] Appl. No.: 13,992

[22] Filed: Feb. 12, 1987

[30] Foreign Application Priority Data

Feb. 17, 1986 [JP] Japan .................. 61-20050[U]

[51] Int. Cl.$^4$ ............................................ B60R 19/04
[52] U.S. Cl. .................................. 293/102; 293/126; 293/154
[58] Field of Search ................ 293/1, 102, 120, 126, 293/154, 155

[56] References Cited

U.S. PATENT DOCUMENTS

| | | | |
|---|---|---|---|
| 1,698,696 | 1/1929 | Goodrich | 293/126 |
| 2,186,505 | 1/1940 | Tibbetts | 293/126 |
| 2,991,110 | 7/1961 | Milner | 293/126 |

FOREIGN PATENT DOCUMENTS 730337  8/1932  France ........................ 293/154

OTHER PUBLICATIONS

Nissan Truck Service Manual; Sep. 1985; #138-86; p. D-19.

Primary Examiner—Robert B. Reeves
Assistant Examiner—Russell D. Stormer
Attorney, Agent, or Firm—Pennie & Edmonds

[57] ABSTRACT

Herein disclosed is a bumper assembly for a vehicle, particularly for a truck or the like. The bumper assembly comprises an elongate main bumper part, a side bumper part bolted to each longitudinal end of the main bumper part at generally right angles, and a reinforcing stay having one end bolted to the main bumper part and the other end bolted to the side bumper part in a manner to form a diagonal beam in building construction.

4 Claims, 3 Drawing Sheets

BUMPER ASSEMBLY

BACKGROUND OF THE INVENTION

1. Field of the Invention

The present invention relates in general to bumper assemblies for a motor vehicle, particularly for a truck or the like, and more specifically, the present invention relates to bumper assemblies of a type which comprises an elongate main bumper part securely connected to a frame of the vehicle and separate side bumper parts connected respectively to longitudinally opposed ends of the main bumper part and extending generally perpendicularly from the same.

2. Description of the Prior Art

In order to clarify the task of the present invention, two conventional bumper assemblies of the above-mentioned type will be outlined with reference to FIGS. 4 and 5.

Referring to FIG. 4, there is shown one of the conventional bumper assemblies, which is disclosed in "NISSAN TRUCK SERVICE MANUAL" page D-19 published on September, 1985. The bumper assembly disclosed in this publication is designed for trucks of a frame type which comprises a vehicle frame on which a vehicle body proper is mounted through rubber-mounts.

The bumper assembly comprises a channel-shaped elongate main bumper part 10 connected through main stays 12 (only one is shown) to the vehicle frame (not shown) of the vehicle, and two side bumper parts 14 (only one is shown) bolted to the longitudinally opposed ends of the main bumper part 10 and extending generally perpendicularly from the same. An auxiliary or side stay 16 extends between each side bumper part 14 and the body proper of the vehicle for achieving assured the connection between the bumper assembly and the vehicle.

However, due to the inherent arrangement of the bumper assembly as mentioned hereinabove, relative displacement inevitably occuring between the vehicle frame and the vehicle body due to jolting of the vehicle during cruising tends to pull and push the side bumper parts 14 through the side stays 16 and finally deform the side bumper parts 14.

Referring to FIG. 5, there is shown the other conventional bumper assembly, which is also designed for the trucks of the frame type.

The bumper assembly comprises a channel-shaped elongate main bumper part 10 connected through stays 12 (only one is shown) to the of the vehicle frame, and two side bumper parts 14 (only one is shown) bolted to the longitudinally opposed ends of the main bumper part 10 and extending generally perpendicularly from the same. An angularly U-shaped reinforcing member 18 is disposed between each side bumper part 14 and each stay 12 and bolted to them for assuring connection between the main bumper part 10 and each side bumper part 14.

Although the arrangement of the this bumper assembly solves the problems of that of FIG. 4, the strongly built reinforcing member 18 induces considerable increase in weight of the bumper assembly thereby not only making mounting of the bumper assembly to the vehicle troublesome but also lowering fuel economy of the vehicle.

SUMMARY OF THE INVENTION

It is therefore an essential object of the present invention to provide an improved bumper assembly for trucks or the like, which is free of the above-mentioned drawbacks.

According to the present invention, there is provided a bumper assembly which has a simple and light-weight reinforcing member installed therein for reinforcing the connection between each side bumper part and the main bumper part.

According to the present invention, there is provided a bumper assembly which comprises an elongate main bumper part, a side bumper part secured to each longitudinal end of the main bumper part at a given angle, and a reinforcing stay having a first end secured to the main bumper part and a second end secured to the side bumper part.

DETAILED DESCRIPTION OF THE INVENTION

Figure 1:
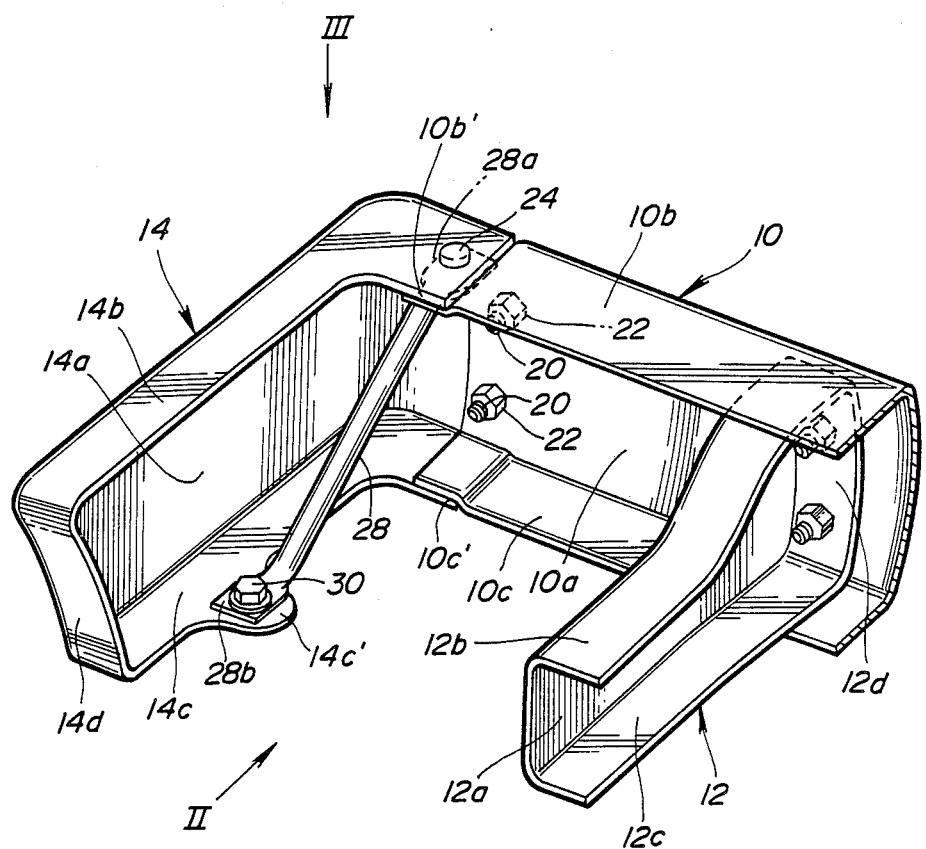
FIG. 1 is a perspective view of a part of a bumper assembly according to the present invention.
Figure 2:
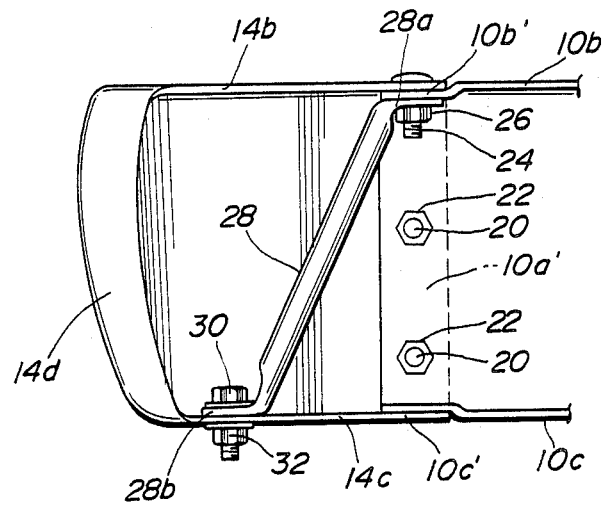
FIG. 2 is a view taken from the direction of an arrow "II" of FIG. 1.
Figure 3:
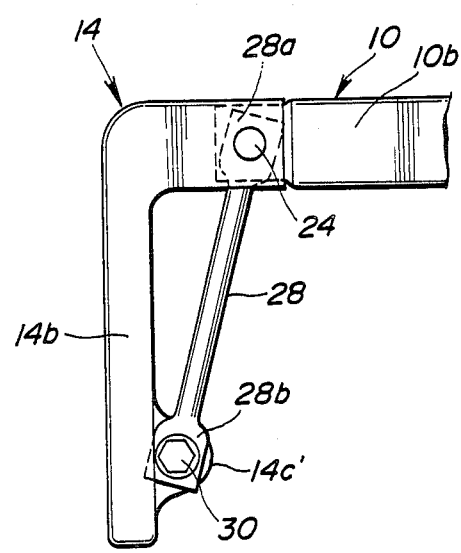
FIG. 3 is a view taken from the direction of an arrow "III" of FIG. 1.

Referring to FIGS. 1 to 3, there is shown a bumper assembly according to the present invention. For ease of description, the bumper assembly will be described as a front bumper assembly which is mounted to a front portion of a truck.

The bumper assembly comprises an elongate main bumper part 10 connected through stout stays 12 to a frame of the truck, and generally L-shaped side bumper parts 14 (only one is shown) respectively connected to the longitudinally opposed ends of the main bumper part 10 and extending generally perpendicularly from the same. The main bumper part 10, the side bumper parts 14 and the stays 12 are all constructed of channel members.

That is to say, the main bumper part 10 comprises a vertically arranged major wall 10a and horizontally arranged upper and lower walls 10b and 10c. Each side bumper part 14 comprises a vertically arranged major wall 14a which has a normally bent portion near its inward end, horizontally arranged upper and lower walls 14b and 14c which extend along the upper and lower edge portions of the major wall 14a, and a vertically arranged rear wall 14d which extends between the rearward end portions of the upper and lower walls 14b and 14c. Each stay 12 comprises a vertically arranged major wall 12a which has an enlarged forward end portion, an upper wall 12b which extends along the curved upper edge portion of the major wall 12a, a horizontally arranged lower wall 12c which extends along the lower edge portion of the major wall 12a, and a vertically arranged front wall 12d which extends between the forward end portions of the upper and lower walls 12b and 12c.

As is best shown in FIG. 1, each stay 12 extending from the truck frame is secured at the front wall 12d to the major wall 10a of the main bumper part 10 by means of bolts and nuts (no numerals).

As is understood from FIGS. 1 and 2, the walls 10a, 10b and 10c of the main bumper part 10 have longitudinal ends which are somewhat depressed inwardly to form stepped portions 10a', 10b' and 10c' respectively. These stepped portions intimately put thereon the forward end portions of the walls 14a, 14b and 14c of the side bumper part 14. Two pairs of bolts 20 and nuts 22 are used for connection between the stepped end portion 10a' of the main bumper part 10 and the forward end portion of the major wall 14a of the side bumper part 14. Another pair of bolt 24 and nut 26 are used for connection between the stepped end portion 10b' of the main bumper part 10 and the forward end portion of the upper wall 14b of the side bumper part 14.

In accordance with the present invention, an elongate reinforcing stay 28 is employed for assuring connection of each side bumper part 14 to the main bumper part 10. As is best seen from FIG. 1, the reinforcing stay 28 extends diagonally between the lower wall 14c of the side bumper part 14 and the stepped end portion 10b' of the upper wall 10b of the main bumper part 10. The bolt 24 and nut 26 serve to connect the upper end of the reinforcing stay 28 to the stepped end portion 10b' of the main bumper part 10, as is best understood from FIG. 2. The lower wall 14c of the side bumper part 14 has near the rear wall 14d an enlarged portion 14c to which the lower end of the reinforcing stay 28 is secured by means of a pair of bolt 30 and nut 32. As shown, the upper and lower ends of the reinforcing stay 28 are formed have enlarged flat portions 28a and 28b for assuring the connection thereof to the main bumper part 10 and the side bumper part 14.

Thus, as will be understood from the above description, the reinforcing stay 28 can serve as a so-called "diagonal beam" in building construction, which is very effective in connecting two parts under a vibrational condition. Experiments have revealed that even when the side bumper part 14 is applied with a certain high load (viz., 60 Kg), the bumper assembly of the present invention shows only negligible deformation of the side bumper part 14 relative to the main bumper part 10 as compared with the afore-mentioned conventional bumper assemblies.

Figure 4:
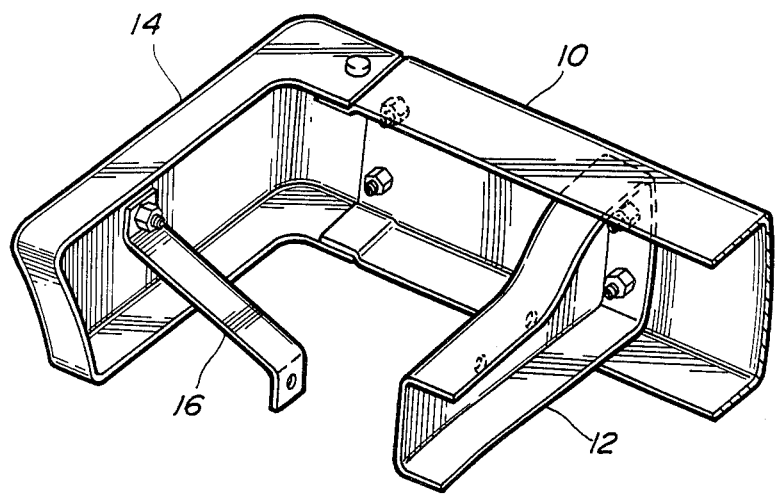
FIG. 4 is a view similar to FIG. 1, but showing one of the afore-mentioned conventional bumper assemblies.
Figure 5:
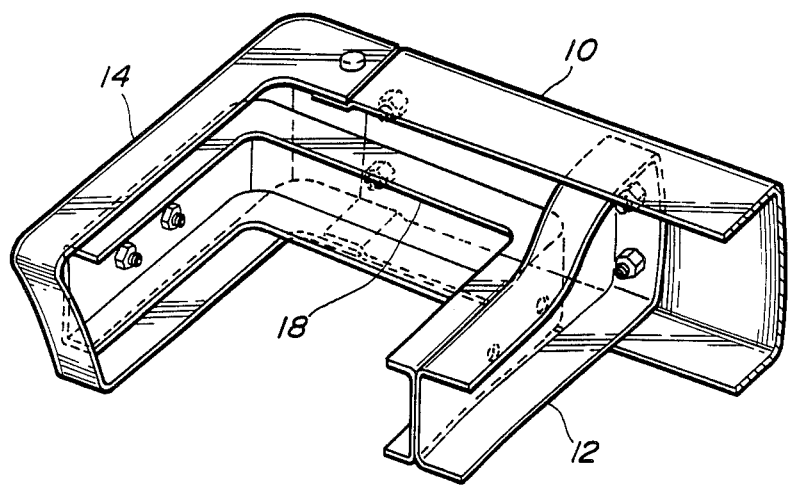
FIG. 5 is a view also similar to FIG. 1, but showing the other conventional bumper assembly.

As will be understood from the foregoing description, in the present invention, the assured connection between the main bumper part and each of the side bumper parts is achieved by the simple and light-weight reinforcing stay 28. Thus, mounting of the bumper assembly to the vehicle can be achieved by only the two main stays connected to the vehicle frame, so that the deformation of the side bumper parts 14 due to the relative displacement between the vehicle frame and the vehicle body (which would occur in the assembly of FIG. 4) is eliminated or at least minimized. Furthermore, because of the light-weight construction of the reinforcing stays 28, the weight increase of the bumper assembly (which would occur in the assembly of FIG. 5) is minimized thereby facilitating the work for mounting the assembly to the vehicle having substantially no effect on the fuel economy of the vehicle to which the bumper assembly is mounted.

What is claimed is:

1. A bumper assembly comprising, an elongated channel shaped main bumper having upper and lower side walls, a channel shaped side bumper having upper and lower side walls secured in overlapping relationship to each longitudinal end of said main bumper, a reinforced stay having a first end secured to the overlapping portions of said main bumper and said side bumper, and having a second end secured to said side bumper, said reinforced stay extending diagonally between a lower side wall of said side bumper and an upper side wall of said main bumper in a manner to serve as a diagonal beam between said bumpers.

2. A bumper assembly as claimed in claim 1, in which said lower side wall of said side bumper part has an enlarged portion to which said second end of the reinforcing stay is secured.

3. A bumper assembly as claimed in claim 2, in which said first and second ends of said reinforcing stay are enlarged as compared with the major portion of the stay.

4. A bumper assembly as claimed in claim 3, in which said given angle between said main bumper part and said side bumper part is approximately 90 degrees.

* * * * *